United States Patent [19]

Mehoudar

[11] 4,209,133
[45] Jun. 24, 1980

[54] DRIP LEVEL IRRIGATION EMITTER UNIT

[76] Inventor: Raphael Mehoudar, 36, Yehuda Hanassi St., Tel-Aviv, Israel

[21] Appl. No.: 845,277

[22] Filed: Oct. 25, 1977

[30] Foreign Application Priority Data

Oct. 26, 1976 [IL] Israel ......................................... 50766

[51] Int. Cl.² ............................................... F16D 1/00
[52] U.S. Cl. ................................ 239/542; 239/533.13; 239/547; 138/43
[58] Field of Search ...................... 239/533.13, 533.14, 239/542, 547; 138/43

[56] References Cited

U.S. PATENT DOCUMENTS

| | | | |
|---|---|---|---|
| 2,511,733 | 6/1950 | Morrison | 138/43 X |
| 3,546,884 | 12/1970 | Timpe | 239/533.13 X |
| 3,777,980 | 12/1973 | Allport | 239/542 X |
| 3,812,876 | 5/1974 | Krieter | 137/501 |
| 3,815,636 | 6/1974 | Menzel | 138/43 X |
| 4,011,893 | 3/1977 | Bentley | 138/43 |

FOREIGN PATENT DOCUMENTS

2535732  2/1976  Fed. Rep. of Germany ........... 239/542

*Primary Examiner*—Robert W. Saifer
*Attorney, Agent, or Firm*—Sandler & Greenblum

[57] ABSTRACT

In a drip level irrigation emitter unit having flow restricting means, a control mechanism, inlet and outlet control chambers of the control mechanism, resiliently flexible membrane sealingly separating the control chambers, the membrane being displaceable with respect to the flow restricting means, the inlet and outlet chambers respectively communicating with an inlet and an outlet of the flow restricting means, the outlet chamber being formed with an outlet aperture of substantially smaller area than that of the membrane, the arrangement being such that upon the liquid pressure in the inlet chamber exceeding the liquid pressure in the outlet chamber by a predetermined amount, the membrane flexes elastically towards the outlet aperture so as to define, with a rim of the aperture, a restricted outflow path thereby limiting variations in the outflow rate.

6 Claims, 6 Drawing Figures

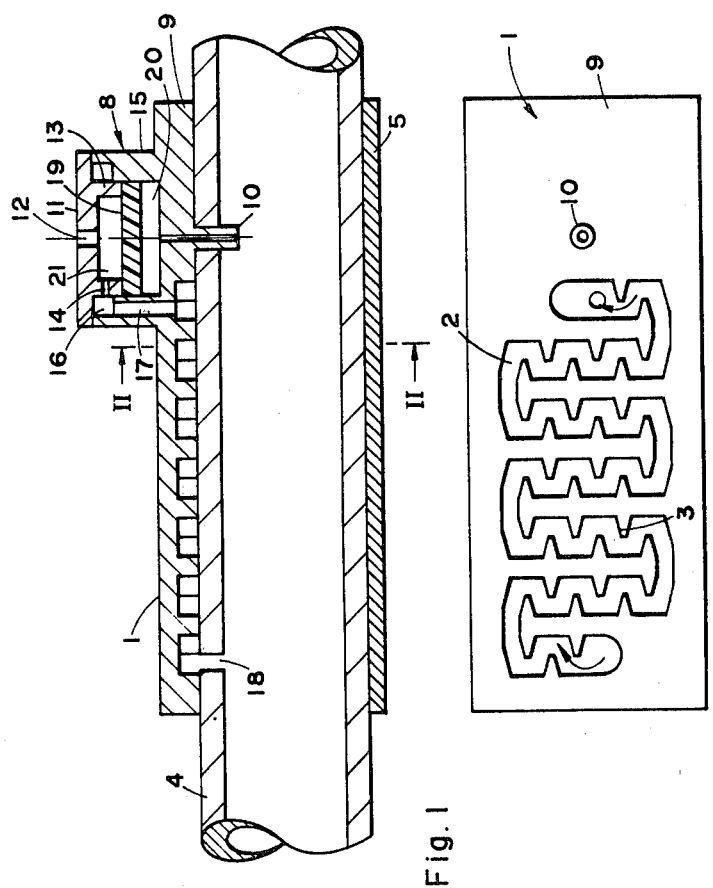

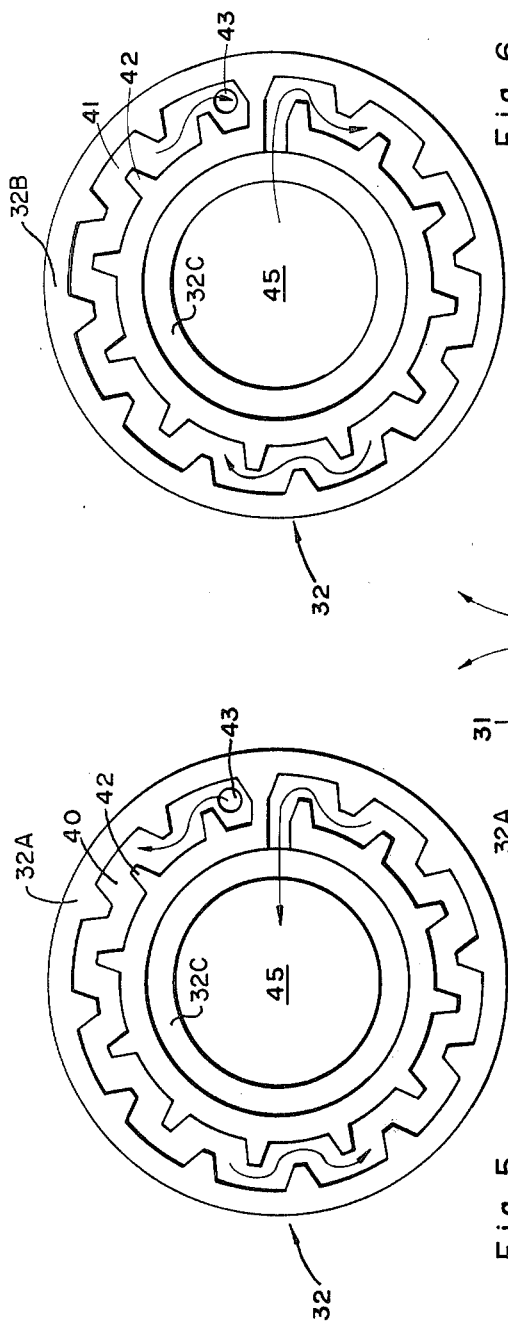
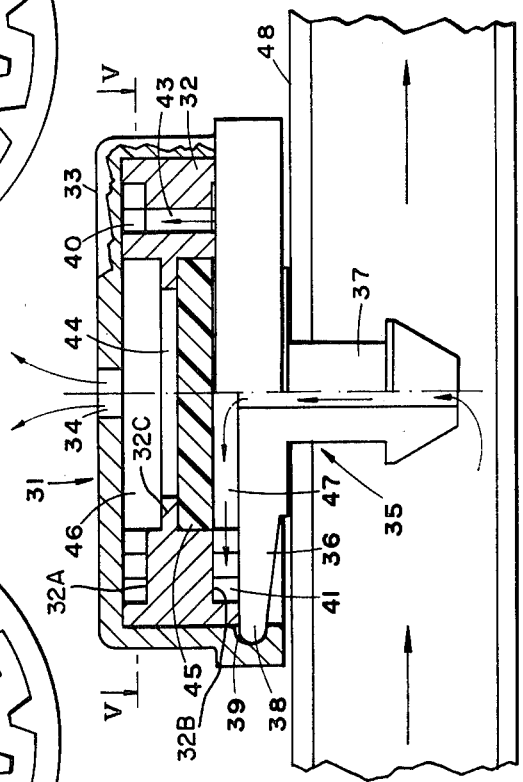

DRIP LEVEL IRRIGATION EMITTER UNIT

This invention relates to drip level irrigation emitter units which include flow restricting means such that liquid, constrained to pass therethrough, has its flow pressure reduced from an initial supply flow pressure to a lower emission flow pressure.

It has long been recognised that the operation of such drip level irrigation emitter units are particularly sensitive to variations in the pressure of the supply liquid. Thus, variations in the supply pressure can well lead to variations in the emission flow rate and these variations can be undesirable.

Such pressure variations can result from fluctuations in the main supply pressure or can arise out of variations in the topography of the site on which the irrigation system is laid. A further cause for such pressure variations can arise with a relatively extensive irrigation system as a consequence of pressure losses through the system.

It is an object of the present invention to provide a drip level irrigation emitter unit with a control mechanism whereby variations of the output emission rate of the device with variations of the input supply pressure are reduced to a minimum.

According to the present invention there is provided, in a drip level irrigation emitter unit having flow restricting means, a control mechanism, inlet and outlet control chambers of said control mechanism, a resiliently flexible membrane sealingly separating said control chambers, said membrane being displaceable with respect to the flow restricting means, said inlet and outlet chambers respectively communicating with an inlet and an outlet of said flow restricting means, said outlet chamber being formed with an outlet aperture of substantially smaller area than that of the membrane, the arrangement being such that upon the liquid pressure in said inlet chamber exceeding the liquid pressure in the outlet chamber by a predetermined amount, said membrane flexes elastically towards the outlet aperture so as to define, with a rim of the aperture, a restricted outflow path thereby limiting variations in the outflow rate.

With a drip level irrigation emitter unit in accordance with the invention, the provision of the resiliently flexible membrane and its location between the two chambers preferably ensures that the liquid pressure in the outlet chamber is always a predetermined fixed amount less than that in the inlet chamber. Preferably the spacing of the membrane from the outlet aperture is such that displacement of the membrane towards the aperture over the major portion of this spacing is not effective in exercising any significant control on the emission flow rate and it is only upon displacement of the membrane over the residual, relatively minor spacing towards the aperture that such control is exercised. In this way it is ensured that pressure control is only exercised once the pressure differential has been established and that the provision of the control mechanism itself does not give rise to undesirable pressure losses during the build-up of this differential.

The requirement that the outlet aperture should be of as small an area as possible compared with that of the membrane is essential seeing that the larger the area of the aperture the more does the magnitude of the inflow pressure affect the control.

With a drip level irrigation emitter unit in accordance with the invention any blockage of the outflow aperture, for example as a consequence of the ingress of surrounding dirt, grit or the like, results in the reduction of the pressure differential on either side of the membrane and the elastic return of the membrane to a less displaced condition. Thus the outflow path becomes de-restricted and the increased pressure in the outlet control chamber results in the flushing out of the blockage from the aperture. A similar situation obtains in the control mechanism during the build-up of the pressure differential upon the onset of irrigation flow and during the dying down of the differential when the irrigation supply is cut off. In both cases the relatively unrestricted outflow path allows for the liquid pressure in the outlet chamber to flush out obstructions from the outlet aperture. In this way the emitter unit can be considered as being self-flushing.

In this context the drip level irrigation emitter unit provided with a control mechanism in accordance with the present invention can be clearly distinguished from that, for example, previously disclosed in U.S. Pat. No. 3,815,636. There is disclosed in this U.S. patent an emitter unit wherein the flow restricting means is constituted by an elongated channel against which an elastomeric member bears. The inflow fluid pressure acts on the elastomeric member so as to deform it and thereby to vary the cross-sectional area of the entire channel in accordance with the applied pressure. With the unit in accordance with this prior proposal, wherein pressure control is exerted along the entire length of the flow restricting channel, should blockage of the channel take place at any portion thereof, flow through the unit ceases and there can be no question of the self-flushing or self-cleansing of the device. Similarly where blockage takes place at the outlet of the device. In fact, once blockage takes place at any intermediate position of the channel, the portion of the channel downstream of this blockage is automatically closed by the unopposed pressure of the elastomeric member thereagainst and in this way the very provision of the elastomeric member serves to aggravate any blockage.

In contradistinction thereto, with the device in accordance with the present invention, control is effected solely at the outlet of the device with the possibility of self-flushing as indicated above. Furthermore, by ensuring the separation of the control mechanism from the flow restricting means itself and the location of the former at outlet of the latter, the operation of the flexible membrane in no way affects the operation of the flow restricting means itself. Thus, as distinct from the prior proposal, in an emitter unit in accordance with the present invention, the flow restricting means, e.g. an elongated flow channel remains unaffected, i.e. does not suffer a reduction in effective dimensions throughout the operation even when the inflow pressure rises substantially.

Various embodiments of drip level irrigation emitter units in accordance with the present invention will now be described by way of example and with reference to the accompanying drawings in which:

FIG. 1. is a longitudinally sectioned view of a drip level irrigation emitter unit in accordance with the present invention shown fitted to an irrigation pipe, FIG. 2 is a cross-sectional view of the unit shown in FIG. 1 taken along the lines II—II, FIG. 3 is a plan view from below of a spread out component of the unit shown in FIGS. 1 and 2, FIG. 4 is a longitudinally sectioned view of a second form of drip level irrigation emitter unit in accordance with the present invention shown and fitted to an irrigation pipe, FIG. 5 is a cross-sectional view of the unit shown in FIG. 4 taken along the line V—V, and FIG. 6 is a plan view from above of the unit shown in FIG. 4.

As seen in FIGS. 1–3 of the drawings, the emitter unit comprises an upper, semi-cylindrical component 1 in which is formed a continuous meandering channel 2 formed with baffle elements 3 of the kind forming the subject of patent application Ser. No. 604,840 i.e. wherein each baffle terminates in a baffle tip of a width $\xi$ where $\xi$ lies in a range extending from close to zero to approximately $0.25\Delta$ where $\Delta$ is the minimum throughflow spacing in the emitter, the baffles of one set being respectively directed towards the inter-baffle regions of the opposite set the tip of each baffle being substantially aligned with the tips of the opposite pair of adjacent baffles. Such baffles are hereinafter referred to as baffle elements of the kind specified. The upper, semi-cylindrical component 1 is held in position around an irrigation pipe 4 by means of a lower semi-cylindrical retaining component 5 having outwardly extending longitudinal flanges 6 which clip retainingly into corresponding longitudinal recesses 7 formed in the upper component.

Formed integrally with one end of the upper semi-cylindrical component 1 is a casing 8 having a base 9 formed integrally with a centrally bored downwardly extending nipple 10. The upper open end of the casing 8 is closed by means of a cap member 11 in which is formed a central outlet aperture 12 and, from which, there downwardly depends a skirt 13 having a radial aperture 14. The upper end of a side wall 15 of the casing 8 is formed with an annular recess 16 which communicates, via a duct 17 formed in the wall 15 with one end of the meandering channel 2, the other end of which is designed to be aligned with an aperture 18 formed in the irrigation pipe 4. The nipple 10 projects through a further aperture formed in the irrigation pipe 4 axially spaced from the aperture 18.

A flexible rubber membrane 19 is located in the casing 8 and, upon water flow through the irrigation pipe 4 and, via the nipple 10, is pressed upwardly against the lowermost edge of the skirt 13. The membrane 19 is therefore effective in dividing the interior of the casing 8 into a lowermost inlet control chamber 20 and an upper outlet control chamber 21 sealingly separated from each other by means of the membrane 19.

In use, and with the emitter unit fitted to an irrigation pipe 4, as shown in the drawings, a portion of the water flowing through the irrigation pipe 4 passes out of the aperture 18 and through the meandering channel 2 and emerges out of the radial aperture 14 into the outlet control chamber 21 with a flow rate and outflow pressure which has been radically reduced as a consequence of its passage through the meandering channel 2. At the same time, water flows out of the irrigation pipe 4 through the nipple 10 into the inlet control chamber 20. In consequence, the water pressure in the inlet control chamber 20 corresponds to that prevailing in the irrigation pipe 4 whilst the water pressure in the outlet control chamber 21 is in fact the water pressure of the water emerging from the emitter unit.

The membrane 19 is so chosen and located vis-a-vis the outlet aperture 12 that the pressure in the outlet chamber 21 is always maintained a predetermined amount less than the pressure in the inlet chamber 20. Thus, if as a result of a rise in the main supply pressure of the water flowing through the irrigation pipe 4, the pressure in the inlet control chamber 20 rises, the sudden increased pressure differential between the inlet and outlet control chambers 20 and 21 causes the membrane 19 to flex towards the outlet aperture 12 thereby creating a restricted flow path defined between the arched membrane 19 and the rim of the aperture 12. As a consequence, the pressure in the outlet chamber 21 tends to rise and the membrane 19 tends to return to its original position. The membrane 19 will therefore tend to adopt an equilibrium position wherein the predetermined pressure differential between the inlet and outlet chambers 20 and 21 is maintained. The degree of construction of the outflow path defined between the membrane 19 and the rim of the outlet aperture 12 determines the emission rate of the emitter unit. It can thus be seen that, by virtue of the movement of the membrane 19 so as to account for differences in the pressure differential, the emission rate is maintained constant within a relatively narrow range.

Any tendency for the outlet aperture 12 to become blocked immediately causes a rise in pressure in the outlet chamber 21, the consequent return movement of the membrane 19 and the flushing out of the blockage as a consequence of the increased pressure in the outlet chamber 21.

Reference will now be made to FIGS. 4–6 of the drawings in which is illustrated an emitter unit of the kind forming the subject of our patent/patent application Ser. No. 604,840.

The emitter unit comprises a casing 31 and a body member 32. The casing 31 consists of a cylindrical cap member 33, open at the base and formed at its upper surface with a centrally located outlet aperture 34. The casing furthermore comprises a separate base member 35 consisting of a base disc 36 and a central, downwardly depending, centrally bored coupling nipple 37. The outer rim 38 of the base disc 36 is adapted to be snap fitted in a corresponding peripheral groove 39 formed on the inner edge of the skirt of the casing. Body member 32 has annular upper surface 31A and an annular lower surface 32B surrounding a central aperture or cavity portion 44 defined by inner peripheral rim 32C which extends into the cavity portion and is spaced from outlet aperture 34. The outer annular portions of surfaces 32A and 32B contain circular flow paths 40, 41, respectively, each of which is provided with baffle sets 42 comprising baffle elements of the kind specified. The groove 41 communicates with the groove 40 via a duct 43. A central aperture 44 defined by the annular body member 32 is closed by means of a disc-like membrane 45 which is normally pressed against the rim of the aperture 44 by upwardly directed water pressure.

The membrane 45 separates an upper outlet control chamber 46 defined by the casing 31 and the membrane 45 from a lower inlet control chamber 47 defined by the disc-like base 36 and the membrane 45.

In use, and with the emitter unit assembled on an irrigation pipe 48 as shown in the drawings, a portion of the water flowing through the pipe 48 passes through the nippel 37 into the inlet control chamber 47 and via the groove 41 and baffles 42, the duct 43, the groove 40 and baffles 42, emerging into the outlet control chamber 46 and from there as a pressureless drip through the outlet aperture 34.

As in the embodiment previously described with reference to FIGS. 1-3 of the drawings, the membrane 45 is designed and located so as to maintain a predetermined pressure differential between the outlet and inlet chambers 47, 46.

The operation of the membrane 45 so as to compensate for variations in the inflowing pressure is, as described above with respect to the preceding embodiment, and, as previously described, the device is effective in ensuring that the emission outflow rate remains substantially constant within very narrow limits despite fluctuations in the pressure in the irrigation pipe 48.

As can be seen in both embodiments just described, the membrane is spaced a relatively substantial distance from the outlet aperture and in this way it can be ensured that a relatively substantial displacement of the membrane is required before the outflow rate is restricted. In this way, it can be ensured that the displacement of the membrane does not of itself introduce undesirable losses during the pressure differential build-up period operation range of the emitter units.

Furthermore, it can be seen that the size of the outlet aperture is relatively small as compared with the size of the membrane. This is necessary in order to ensure that the predetermined pressure differential between the chambers previously referred to is not unduly influenced by the magnitude of the inflow pressure.

It will furthermore be seen that the provision of the flexibly resilient, i.e. elastic membrane serves in effect a triple purpose, namely:
(1) it sealingly separates the inlet from the outlet control chamber,
(2) it serves to define, with the rim of the outlet aperture the restricted outflow path, and
(3) being elastic there is obviated the necessity of providing mechanical means such as, for example, a spring to ensure the return displacement of the membrane.

In one particular example of a control mechanism for an emitter unit constructed substantially in accordance with that shown in FIG. 1 of the drawings the following dimensions and material characteristics were employed.

Membrane:
    Overall diameter=16 mm
    Diameter of central area not covered by peripheral edge of skirt 13=13 mm
    Thickness=2.15 mm
    Material—Rubber of 50 Shore hardness
Outlet Aperture:
    Diameter=2 mm
    Spacing from membrane=2.8 mm With such a construction it was ensured that a pressure differential between the inlet and outlet control chambers of 1 atmosphere was maintained. It was furthermore found that for variations of inflow pressure ranging between 1 atm. and 3 atm. an emitter outflow rate 4 liters per hour ±2.7% was maintained.

Whilst in the embodiments specifically described above the flow restricting means has been an elongated channel along which the water is constrained to flow, restricting means of other constructions can equally well be employed with control mechanisms in accordance with the present invention.

I claim:

1. A drip level irrigation emitter unit comprising a casing member; a body member retainably fitted within the casing member; inner wall portions of said emitter unit defining inlet and outlet control chambers; said emitter unit having an outlet aperture connected to said outlet control chamber; one of said members having an internally disposed surface; an outer annular portion of said surface having an elongated flowpath formed therein, and a central cavity portion which includes said outlet control chamber and which is surrounded by said outer annular portion; said body member having an inner peripheral rim surrounding said cavity portion and spaced from said outlet aperture; a first end of said flowpath communicating with said inlet control chamber and a second end of said flowpath communicating with said outlet control chamber; said rim defining an area substantially greater than that of said outlet aperture; a resiliently flexible membrane adapted to be held against said inner peripheral rim and separating said inlet and outlet control chambers; flow coupling means for flow coupling said inlet control chamber to an irrigation conduit, the arrangement being such that upon the liquid pressure in said inlet chamber exceeding the liquid pressure in the outlet chamber by a predetermined amount, said membrane flexes elastically towards the outlet aperture so as to define, with a rim of the aperture, a restricted outflow path thereby limiting variations in the outflow rate.

2. A drip level irrigation emitter unit according to claim 1 wherein two sets of oppositely directed baffles project into said flow path.

3. A drip level irrigation emitter unit according to claim 2 wherein each baffle terminates in a baffle tip of a width $\xi$ where $\xi$ lies in a range extending from close to zero to approximately 0.25$\Delta$ where $\Delta$ is the minimum throughflow spacing in the emitter, the baffles of one set being respectively directed towards the inter-baffle regions of the opposite set the tip of each baffle being substantially aligned with the tips of the opposite pair of adjacent baffles.

4. A drip level irrigation emitter unit according to claim 1 wherein said body member is of annular shape having formed therein a central throughgoing cavity which includes said outlet control chamber, said body member being retained within said casing member by means of a cap member held within the casing and defining with said body member and said membrane said inlet control chamber.

5. A drip level irrigation emitter unit according to claim 4 wherein said base member is formed integrally with a coupling nipple in which is formed an emitter unit inlet and which constitutes said flow coupling means.

6. A drip level irrigation emitter unit according to claim 1 or 4 wherein said membrane is adapted to be pressed sealingly against said inner peripheral rim solely under the influence of water pressure in said inlet control chamber.

* * * * *

UNITED STATES PATENT AND TRADEMARK OFFICE
CERTIFICATE OF CORRECTION

PATENT NO. : 4,209,133
DATED : June 24, 1980
INVENTOR(S) : Raphael MEHOUDAR

It is certified that error appears in the above—identified patent and that said Letters Patent is hereby corrected as shown below:

In the cover page, column 1, between the listing of the inventor and the listing of the application number, insert:

ASSIGNEE: Hydro-Plan Engineering Ltd.
Tel-Aviv, ISRAEL

Signed and Sealed this

Twenty-first Day of October 1980

[SEAL]

Attest:

SIDNEY A. DIAMOND

Attesting Officer     Commissioner of Patents and Trademarks